May 29, 1928.
F. R. PORTER
INTERNAL COMBUSTION ENGINE
Filed Nov. 25, 1924
1,671,254
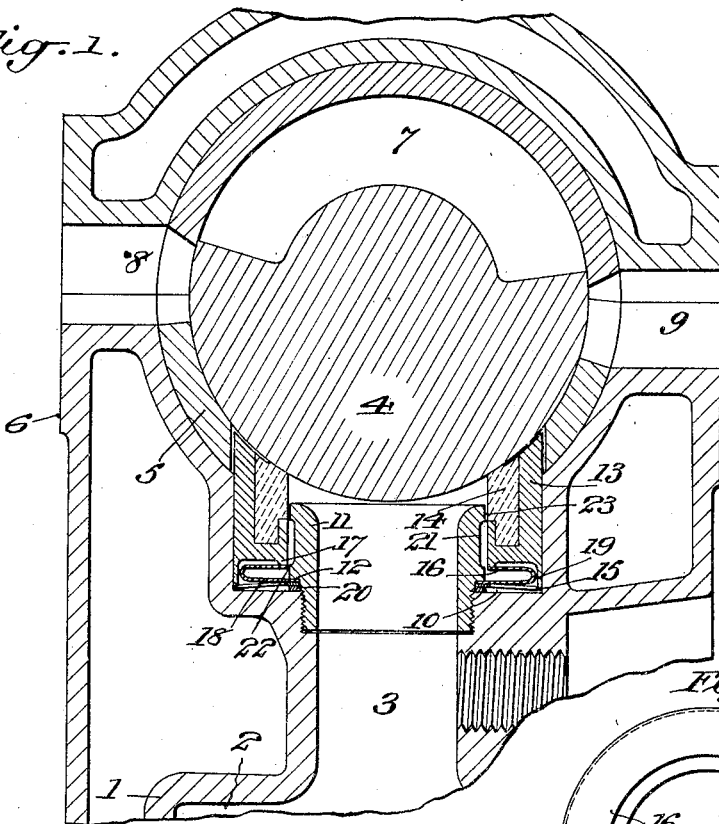
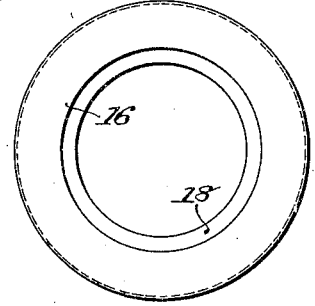
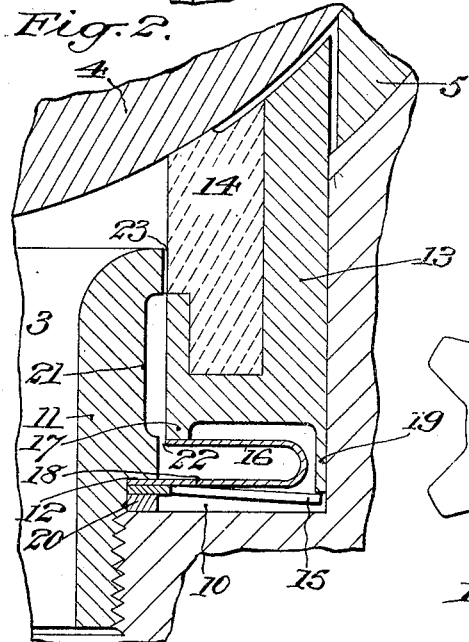
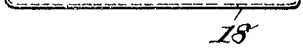
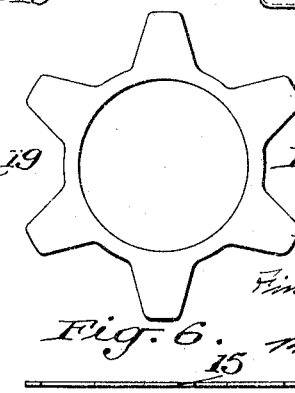
INVENTOR
Finley R. Porter
BY
ATTORNEYS Patented May 29, 1928.

1,671,254

UNITED STATES PATENT OFFICE.

FINLEY R. PORTER, OF NEW YORK, N. Y., ASSIGNOR TO PORTER ENGINE DEVELOPMENT, INC., OF NEW YORK, N. Y., A CORPORATION OF NEW YORK.

INTERNAL-COMBUSTION ENGINE.

Application filed November 25, 1924. Serial No. 752,157.

My invention relates to internal combustion engines and is shown in connection with an internal combustion engine of the rotary valve type in which the cylinder has a common inlet and discharge port, the valve chest has separate inlet and discharge ports and the valve has a peripheral bridge port located in the same plane as the cylinder and valve chest ports.

The object of my invention is to provide a novel packing engaging the valve around the cylinder port for preventing leakage, for ensuring the proper lubrication of the parts, for providing sufficient pressure of the sealing ring on the valve to obtain a gas-tight engagement without too much friction and for preventing the deposit of carbon along the inner wall of the packing chamber, but at the same time permitting the restricted passage of gas along the same into the diaphragm where it is trapped.

A practical embodiment of my invention is represented in the accompanying drawings, in which Fig. 1 represents a vertical cross section through so much of an internal combustion engine of the rotary valve type as includes my invention.

Fig. 2 represents an enlarged detail cross section at the cylinder port.

Fig. 3 represents a plan view of the compound diaphragm.

Fig. 4 represents an edge view of the same.

Fig. 5 represents a plan view of the packing advancing spring.

Fig. 6 represents an edge view of the same.

The cylinder is denoted by 1, the combustion chamber by 2 and the cylinder port by 3. The valve 4 is rotatably mounted in the sleeve 5 within the bore of the valve chest 6, which valve is provided with a peripheral bridge port 7. The valve chest is provided with a motive fluid inlet port 8 and an exhaust port 9 opening through the bearing sleeve 5 to the face of the valve 4. The ports 3, 7, 8 and 9 are all located in the same plane.

The cylinder 1 is provided with an annular packing chamber 10 surrounding the port 3 and opening to the face of the valve 4. Within this chamber 10 I locate a ring 11 which has a screw-threaded engagement with the walls of the cylinder port 3, the bore of which ring forms a continuation of the said port. This ring is also provided with an annular exterior shoulder 12 at the base of the screw threaded portion. A packing is also located within the chamber 10, which packing surrounds the cylinder port and is herein shown as comprising an annular holder 13 and a removable sealing ring 14, which sealing ring is composed of an oil impregnated self-lubricating bearing material such, for instance as "genalite".

The means which I have shown for pressing the packing upwardly into the required frictional engagement with the face of the valve, to prevent leakage thereby, comprises a spring 15 and a compound diaphragm, both located in the chamber 10. The inner edge of the upper wall 16 of the compound diaphragm is engaged with the flange 17 on the bottom of the sealing ring holder 13, said edge being preferably permanently joined to the said flange as, for instance, by welding to form a gas tight joint. The lower wall 18 of the compound diaphragm projects inwardly beyond the outer wall and has its edge clamped between the shoulder 12 of the ring 11 and the bottom of the chamber 10 to form a gas tight joint.

The spring 15 comprises an exteriorly pronged washer of resilient material, the inner edge of which is clamped between the shoulder 12 of the cylinder ring 11 and the bottom of the chamber 10 and the prongs of which spring bear against the peripheral flange 19, projecting from the bottom of the holder 13. The prongs of this spring 15 are deflected sufficiently to press the packing upwardly against the face of the rotary valve with a force sufficient to hold the packing against the valve during the induction stroke of the engine.

A suitable spacing washer 20 is provided for properly spacing the spring from the bottom of the chamber 10. The exterior wall of the cylinder ring 11, above the shoulder 12, is provided with a circumferential wide and shallow recess 21 opposite the inner wall of the packing, having a restricted opening 22 between said recess and the interior of the diaphragm and a restricted spacing 23 between the recess and the cylinder port. This arrangement permits the gas to be forced under high pressure due to the charge explosion into the interior of the diaphragm but traps to a considerable degree the gas in the diaphragm and thus prevents the walls of the diaphragm from becoming unduly heated and yet at the same time prevents the deposit of carbon along the said restricted openings tending to prevent the admission of gas to the interior of the diaphragm for exerting the desired upward pressure on the packing during high pressures in the cylinder port.

It is evident that various changes may be resorted to in the construction, form and arrangements of the several parts without departing from the spirit and scope of my invention; hence, I do not wish to limit myself to the particular embodiment herein shown and described, but

What I claim is:—

1. In an internal combustion engine, a rotary valve, a cylinder having a port and a packing chamber surrounding it, a packing in said chamber comprising a sealing ring and holder therefor, a compound diaphragm in said chamber having substantially parallel walls, the unjoined edges of said walls having gas tight joints with the cylinder and holder respectively, and a spring located in said chamber for holding the sealing ring against said valve.

2. In an internal combustion engine, a rotary valve, a cylinder having a port and a packing chamber surrounding it, a packing in said chamber comprising a sealing ring of oil impregnated self-lubricating bearing material and a holder therefor, a compound diaphragm in said chamber having substantially parallel walls, the unjoined edges of said walls having gas tight joints with the cylinder and holder respectively, and a spring located in said chamber for holding the sealing ring against said valve.

3. In an internal combustion engine, a rotary valve, a cylinder having a port and a packing chamber surrounding it, a packing in said chamber comprising a sealing ring and a holder therefor, a compound diaphragm in said chamber having inwardly extended substantially parallel walls, the edge of one wall being permanently joined to said holder with a gas tight joint and the edge of the other wall engaging said cylinder with a gas tight joint, the interior of said diaphragm having a restricted communication with said port, and a spring located in said chamber for holding the sealing ring against said valve.

4. In an internal combustion engine, a rotary valve, a cylinder having a port and a packing chamber surrounding it, a packing in said chamber comprising a sealing ring of oil impregnated self-lubricating bearing material and a holder therefor, a compound diaphragm in said chamber having inwardly extended substantially parallel walls, the edge of one wall being permanently joined to said holder with a gas tight joint and the edge of the other wall engaging said cylinder with a gas tight joint, the interior of said diaphragm having a restricted communication with said port, and a spring located in said chamber for holding the sealing ring against said valve.

5. In an internal combustion engine, a rotary valve, a cylinder having a port and a chamber surrounding it, a packing around said port within said chamber comprising a sealing ring of oil impregnated self-lubricating bearing material and a holder therefor, a compound diaphragm having gas tight joints with the holder and cylinder, the interior of the diaphragm being in leakage communication with said port, said holder having a circumferential flange projecting from its bottom radially beyond the diaphragm, and a spring washer having prongs engaging said flange for holding the sealing ring in contact with the valve.

In testimony, that I claim the foregoing as my invention, I have signed my name this 21st day of November, 1924.

FINLEY R. PORTER.